United States Patent
Arai

(10) Patent No.: US 7,280,559 B2
(45) Date of Patent: Oct. 9, 2007

(54) DISTRIBUTED APPLICATION LAYER PROTOCOL CONVERTER FOR COMMUNICATIONS NETWORK

(75) Inventor: Kanehide Arai, Burlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1124 days.

(21) Appl. No.: 10/222,399

(22) Filed: Aug. 16, 2002

(65) Prior Publication Data
US 2004/0032881 A1    Feb. 19, 2004

(51) Int. Cl.
*H04J 3/16* (2006.01)
(52) U.S. Cl. ....................... 370/466
(58) Field of Classification Search ............ None
See application file for complete search history.

(56) References Cited

U.S. PATENT DOCUMENTS 6,400,729 B1 *  6/2002  Shimadoi et al. .......... 370/466
6,728,603 B2 *  4/2004  Pruzan et al. .............. 701/1
6,792,337 B2 *  9/2004  Blackett et al. ............ 700/295
2004/0267933 A1 * 12/2004  Przybylski et al. ........ 709/227

* cited by examiner

*Primary Examiner*—Frank Duong
(74) *Attorney, Agent, or Firm*—Dirk Brinkman; Clinton D. Mueller; Gene V. Vinokur

(57) ABSTRACT

A method converts from a first application layer protocol to a second application layer protocol in a communications network. A request in the first application layer protocol is received from a requesting node in an application node. The request is sent to a converter node to translate the message to the second application layer protocol. The converted request is then sent back to the application node from the converter node. The application node can then construct a response to the request, which is also translated by the converter node, before it responded to the requesting node.

10 Claims, 4 Drawing Sheets

DISTRIBUTED APPLICATION LAYER PROTOCOL CONVERTER FOR COMMUNICATIONS NETWORK

FIELD OF THE INVENTION

This invention relates generally to data communications systems, and more particularly protocol conversion between different types of application protocols.

BACKGROUND OF THE INVENTION

With a growing demands for open ubiquitous computer systems and multi-venders, various types of connection modes are required in communications systems. For example, there is a need to connect nodes of one local area network (LAN) to nodes of other LANs via wide area networks (WAN) such as the Internet, or wired and wireless telephone networks. In this arrangement nodes can be server computers, workstations, PCs, portable computers, wearable computers, personal digital assistants (PDA), specialized devices, such as sensors and industrial equipment controllers, and peripheral devices such as printers, file systems, and so forth.

As communications networks continue to evolve, so do the protocols used by the various nodes and network components, such as bridges, routers, and gateways, as well as the nodes.

Bridges typically provide physical links between various networks. Routers provide connections between networks by processing up to the network layer of a protocol model to recognize what type of communication devices are connected in the networks, and sending information necessary to destination nodes. Gateways, which can process all of the layers of a protocol model, up to an application layer, convert between an external protocol and an internal protocol of the LAN. Because gateways are protocol conversion systems, which process layers up to the application layer, designing the gateways is complex and can take a long time.

Various protocol models are known, such as the open system interconnection (ISO) model, and the TCP/IP model 400 shown in FIG. 4. Generally, models include application layers 401, and network layers 402. The network layers 402 can include transport (TCP, UDP), internet (IP, ICMP), network interface (ARP, RARP), and hardware (Ethernet, NIC) layers. The application layers 401 can include FTP, TELNET<E-mail, SNMP, SOAP, uPnP, http, and device specific layers.

FIG. 1 shows a typical prior art network arrangement 100. The arrangement includes an external node 101, a wide area network (WAN) 110, e.g., the Internet, a gateway 120, a local area network (LAN) 130, and an internal node 102. A first protocol 111 is used "outside" the gateway 120, and a second protocol 131 is used "inside" the gateway. Therefore, the gateway 120 includes a protocol converter 121.

Typically, the gateway 120 "hides" the internal node 102 from the external node 101. This is intentional for security reasons. Therefore, the external node cannot discover the address of the internal node. Instead, the external node has a proxy address provided by the gateway, and the external node can only communicate indirectly with the internal node via this proxy address. Obviously, should the gateway fail, communications with the external node likewise fails. In addition, this arrangement makes it difficult to integrate many different converters for multiple protocols in the gateway 120.

In ubiquitous network environments, it is desired that any node can communicate with any other node in the network, with or without going through a gateway. Also, many standard application protocol layers 401 are used, such as SOAP, uPnP, and http. All of these require processing above the network layers 402. However, small specialized nodes, such as remote sensors or industrial controllers, have limited storage and processor capabilities. This makes it difficult to implement all of the necessary protocol stack in nodes with a "small memory footprint." In addition, it is desired that these devices can with other nodes without having to pass through gateway. Therefore, there is a need for a protocol conversion strategy which can alleviate the problems of the prior art.

SUMMARY OF THE INVENTION

A method converts from a first application layer protocol to a second application layer protocol in a communications network. A request in the first application layer protocol is received from a requesting node in an application node. The request is sent to a converter node to translate the message to the second application layer protocol. The converted request is then sent back to the application node from the converter node.

The application node can then construct a response to the request, which is also translated by the converter node, before it responds to the requesting node.

DETAILED DESCRIPTION OF THE PREFERRED EMBODIMENT

System Structure

Figure 1:
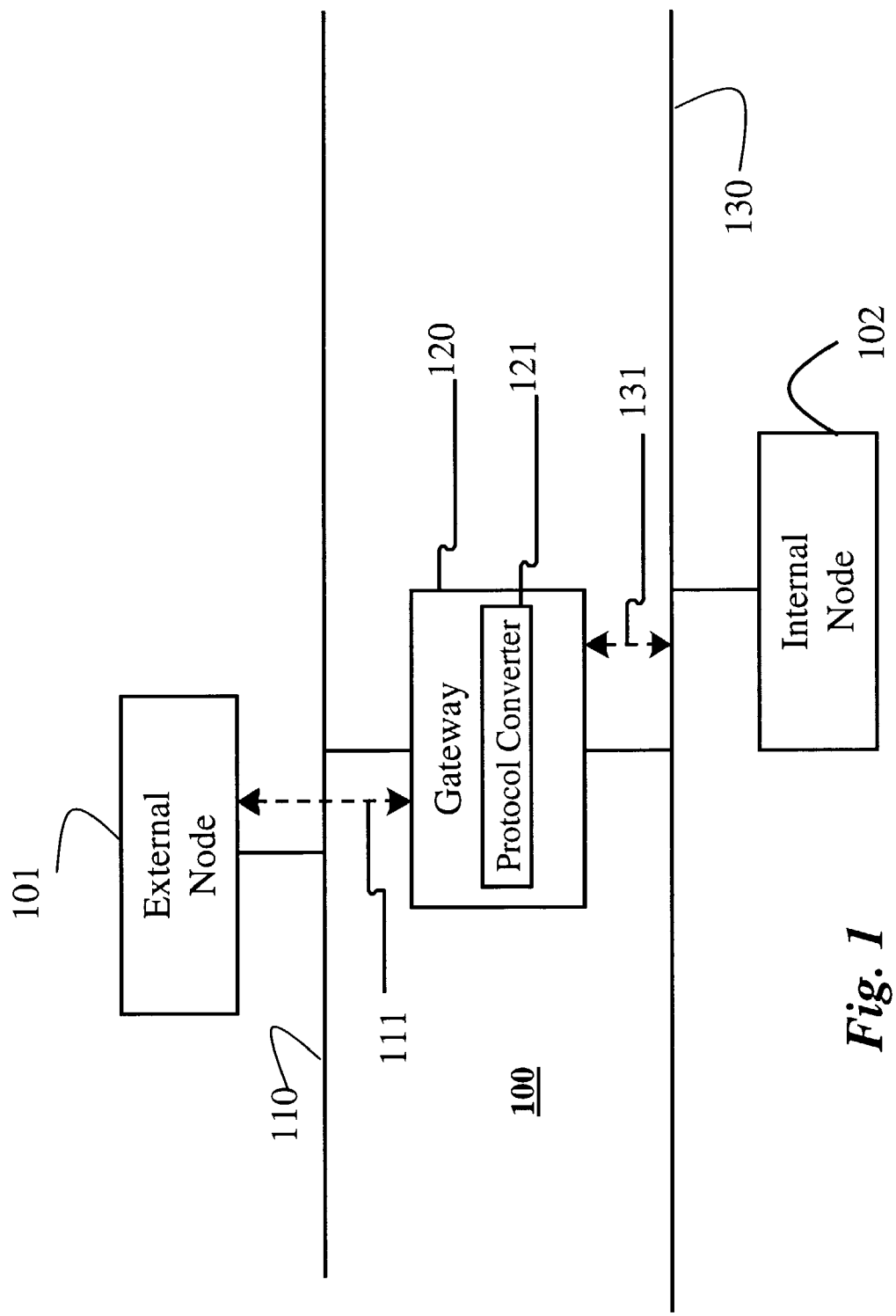
FIG. 1 is a block diagram of a prior art application layer protocol conversion.
Figure 2:
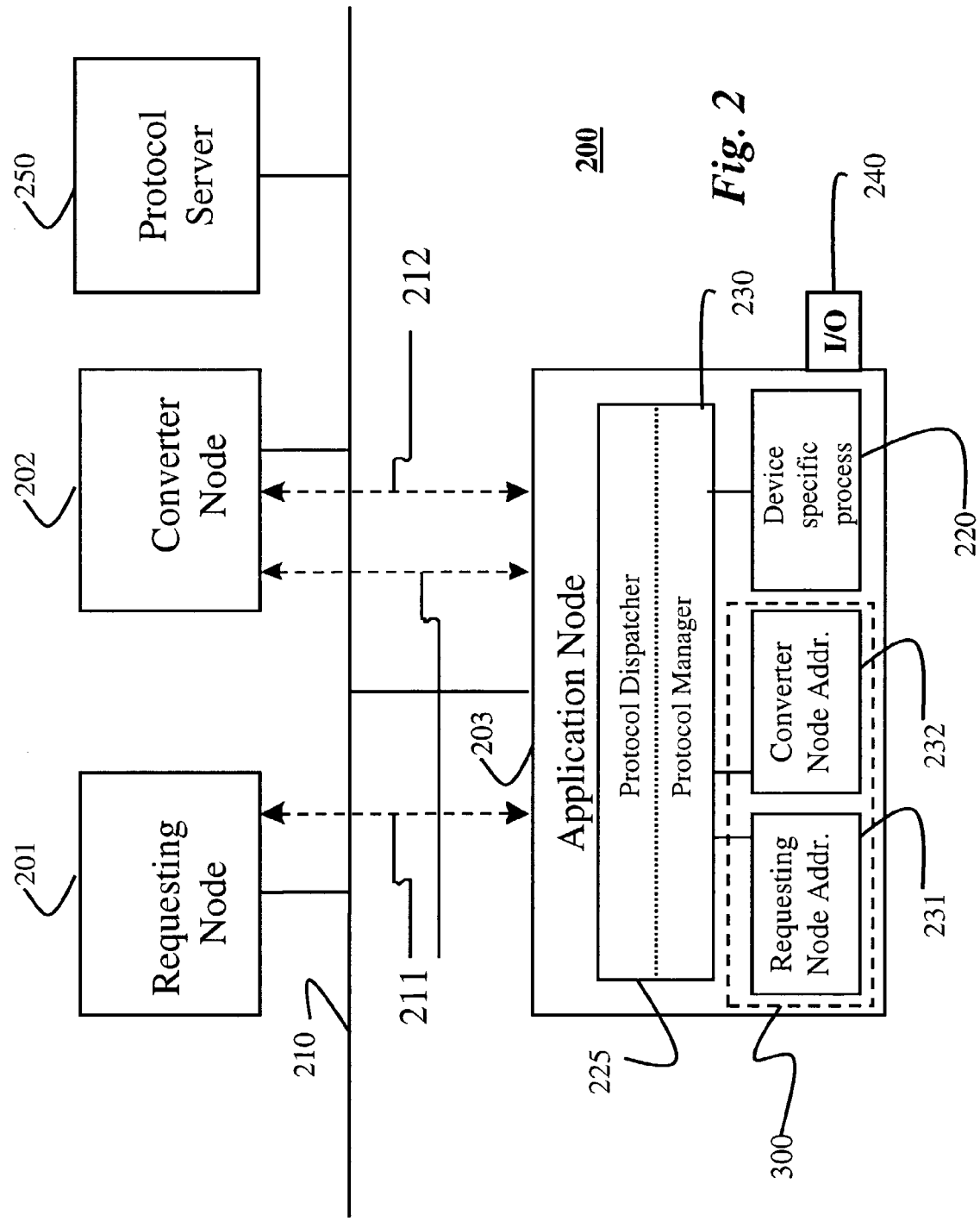
FIG. 2 is a block diagram of distributed application layer protocol conversion according to the invention.

The FIG. 2 shows a network arrangement 200 with distributed conversion of application protocol layers according to the invention. A network 200 connects a requesting node 201, a converter node 202, and an application node 203. Each node has a unique associated network (IP) address. The application node 203 includes a memory to store a conversion table described in greater detail below. The table 300 includes the address 231-232 of the requesting and converter nodes.

The application node 203 also includes a protocol dispatcher 225 and a protocol manager 230, and a device specific process or application 220. In this example, the application node is a temperature sensor responding to requests by the requesting nodes 201 to provide temperature readings, for example.

System Operation

The requests and responses are communicated using application layer protocols 211 and 212, as described in greater detail below. For example, the requesting node can only process protocol 211, and the application node can only process protocol 212. All nodes use common network protocol layers. Therefore, the converter node translates between the two protocols.

Therefore, request messages from the requesting node 201 to the application node 203 are forwarded to the converter node 202 by the protocol dispatcher using the table 300. The converter node 202 converts message from protocol 211 to protocol 212, and sends the converted message back to the application node. The application node sends response message to the converter node, where the messages are translated, send back to the application node, where they can be sent on to the requesting node 201. Note, that the converter node does not need to know the address of the requesting node 201. The converter always sends a translated message to the same exact node from which it received the message.

Conversion Table

Figure 3:
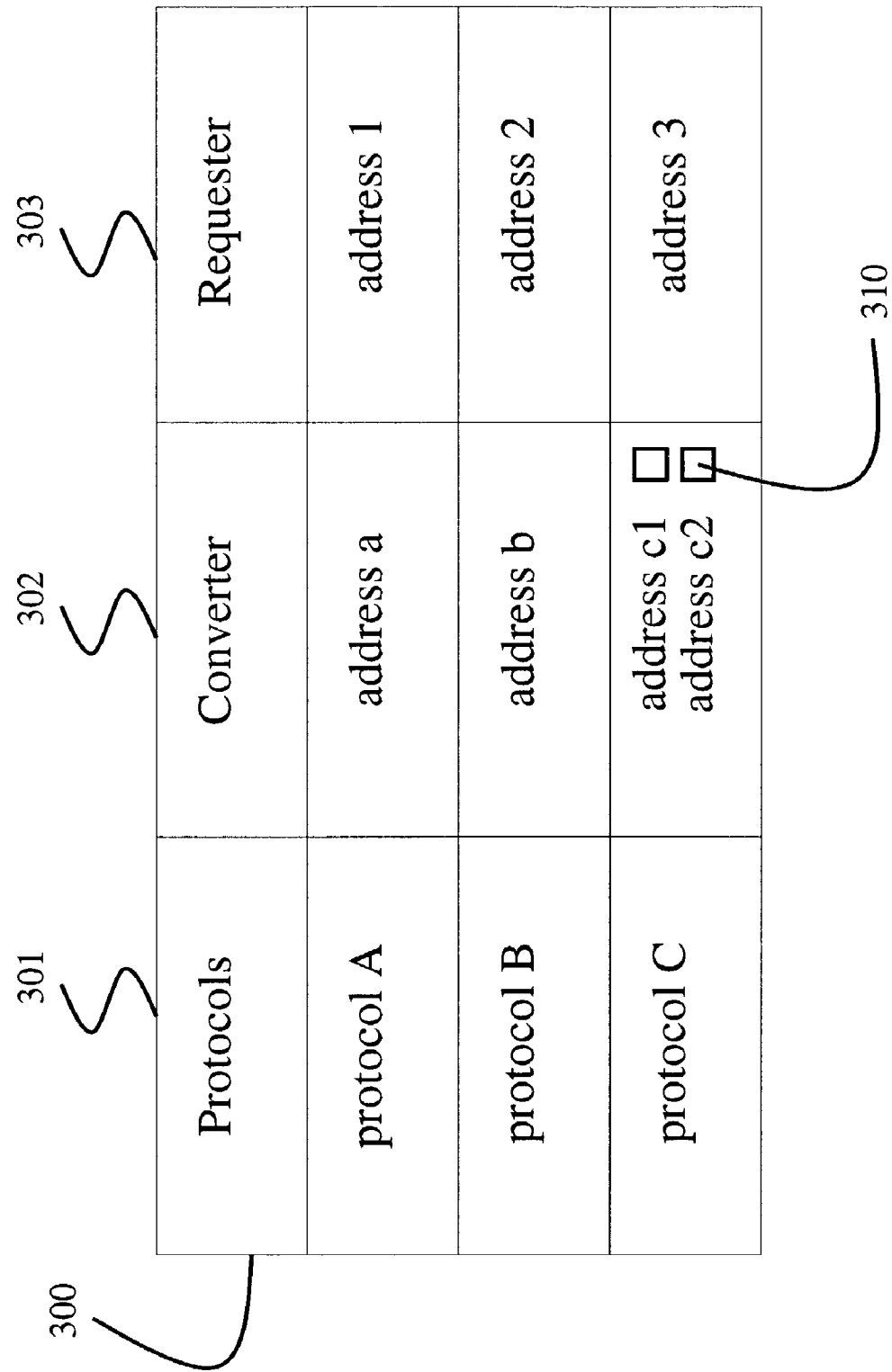
FIG. 3 is a block diagram of a application layer protocol conversion table.
Figure 4:
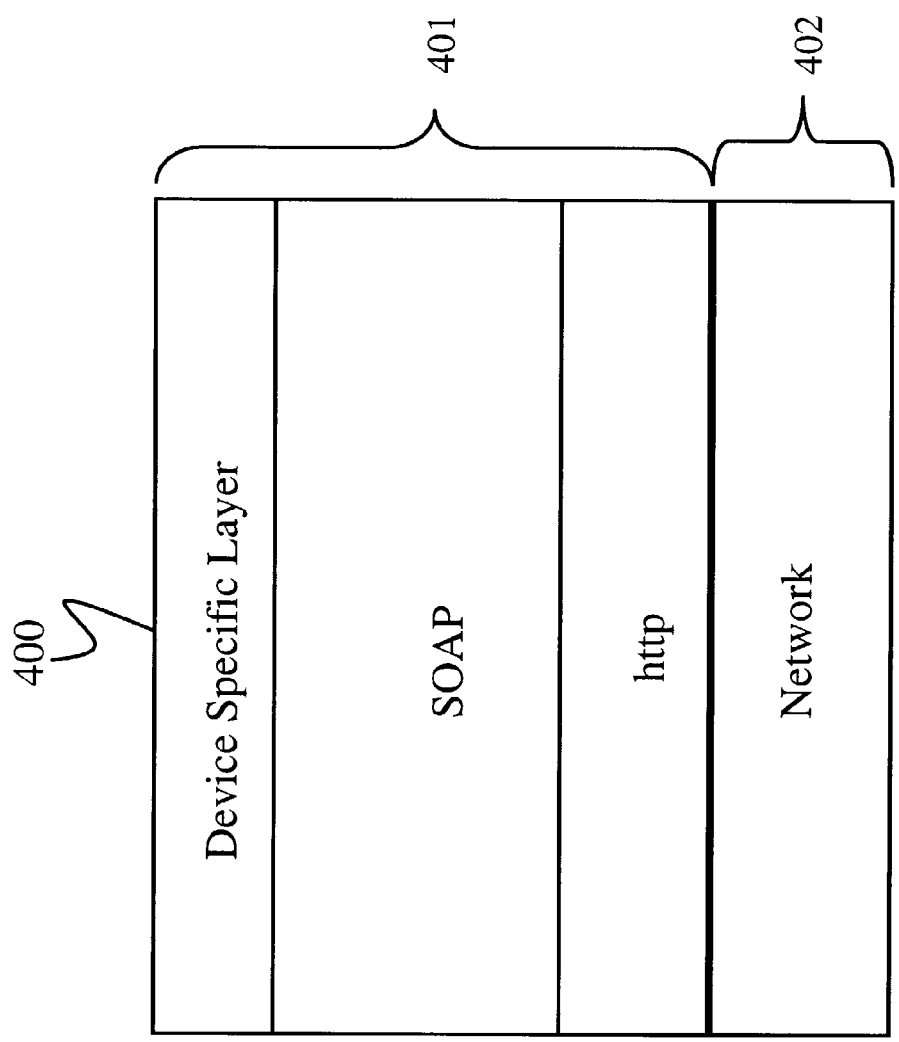
FIG. 4 is a block diagram of a protocol stack used by the invention.

FIG. 3 shows the tabular structure 300 in greater detail. The table is constructed and maintained by the protocol manger 330. For each protocol name 301, an address 302 of a converter node, and an address 303 of a requesting node are stored. Note, the address of the requesting node is only stored temporarily until the response to a request has been provided. At that time, a request from a different node can be processed.

The protocol dispatcher 225 checks for the protocol of a received message and searches for the same protocol in the protocol table 300. If it finds the protocol, but the requester is not in the table, then the dispatcher forwards the received message to the protocol converter using the converter's address, and records the address of the requesting node in the table 300 for a future response.

If the protocol of the received message is the same as the protocol used by the application node, then the message can be processed by the application node itself. If the received message comes from the converter, then the dispatcher forwards the received message to the node with the corresponding requesting node address.

In an alternative embodiment, multiple converter nodes can be used for any one protocol, see protocol C where there are multiple addresses. Then, a timer can be used to switch to another converter, in case of a time out failure. If a converter is unavailable, a bit 310 can be set. The bit can be reset after a predetermined amount of time, or when the converter signals that it is available again.

The table 300 can be constructed locally by the protocol manger 230 via information sent over an I/O port 340 of the application node 203. The table 300 can also be loaded from a memory card, or the table can be loaded via the network 210 using a wired or wireless link. In this case, a protocol server 250 can store protocols and converter address. Then, as converters are designed, these can be registered with the protocol server 250, thus providing a totally distributed solution to application layer protocol conversion.

With the invention, application nodes do not need to have a processing module for each possible protocol in a network. Instead, application nodes store addresses of converter nodes that convert between different protocols. Thus, a new protocol conversion can be done by an application node by providing the application node with the address of an appropriate converter node. The application node itself does not need to be upgraded. In addition, the invention allows nodes to communicate with each other without going through a gateway as in the prior art. The distributed protocol converters, as described above, can be placed at any convenient location in the network 210.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A method for converting messages between a first application layer protocol and a second application layer protocol in a communications network, comprising:
   receiving, in an application node, a request message in the first application layer protocol from a requesting node;
   sending the request message to a converter node to translate the request message to the second application layer protocol; and
   receiving, in the application node, the translated request message in the second application layer protocol node from the converter node, wherein the receiving and the sending in the application node are performed by a protocol dispatcher.

2. The method of claim 1 further comprising:
   sending a response message in the second application layer protocol from the application node to the converter node to translate the response message to the first application layer protocol;
   receiving, in the application node, the response message in the first application layer protocol from the converter node; and
   sending the response message in the first application layer protocol to the requesting node in response to the request message.

3. The method of claim 1 further comprising:
   storing a table in the application node; each entry in the table comprising a protocol name and an address of an associated converter node.

4. The method of claim 3 wherein a plurality of addresses for a plurality of corresponding converter nodes are stored for each protocol name.

5. The method of claim 4 wherein each of the plurality of addresses has an associated availability bit.

6. The method of claim 3 wherein the table is constructed from information received via an I/O port of the application node.

7. The method of claim 3 wherein the table is constructed from information received via the network.

8. The method of claim 3 wherein the table is constructed by a protocol manager of the application node.

9. The method of claim 1 wherein the application node includes a device specific process.

10. A system for converting messages between a first application layer protocol and a second application layer protocol in a communications network, comprising:
    a requesting node configured to send a request message in the first application layer protocol;
    an application node configured to receive the request message and forward the request message; and
    a converter node configured to translate the request message from the first application layer protocol to the second application layer protocol and to send the translated request message to the application node, wherein the receiving and the sending in the application node are performed by a protocol dispatcher.

* * * * *